UNITED STATES PATENT OFFICE.

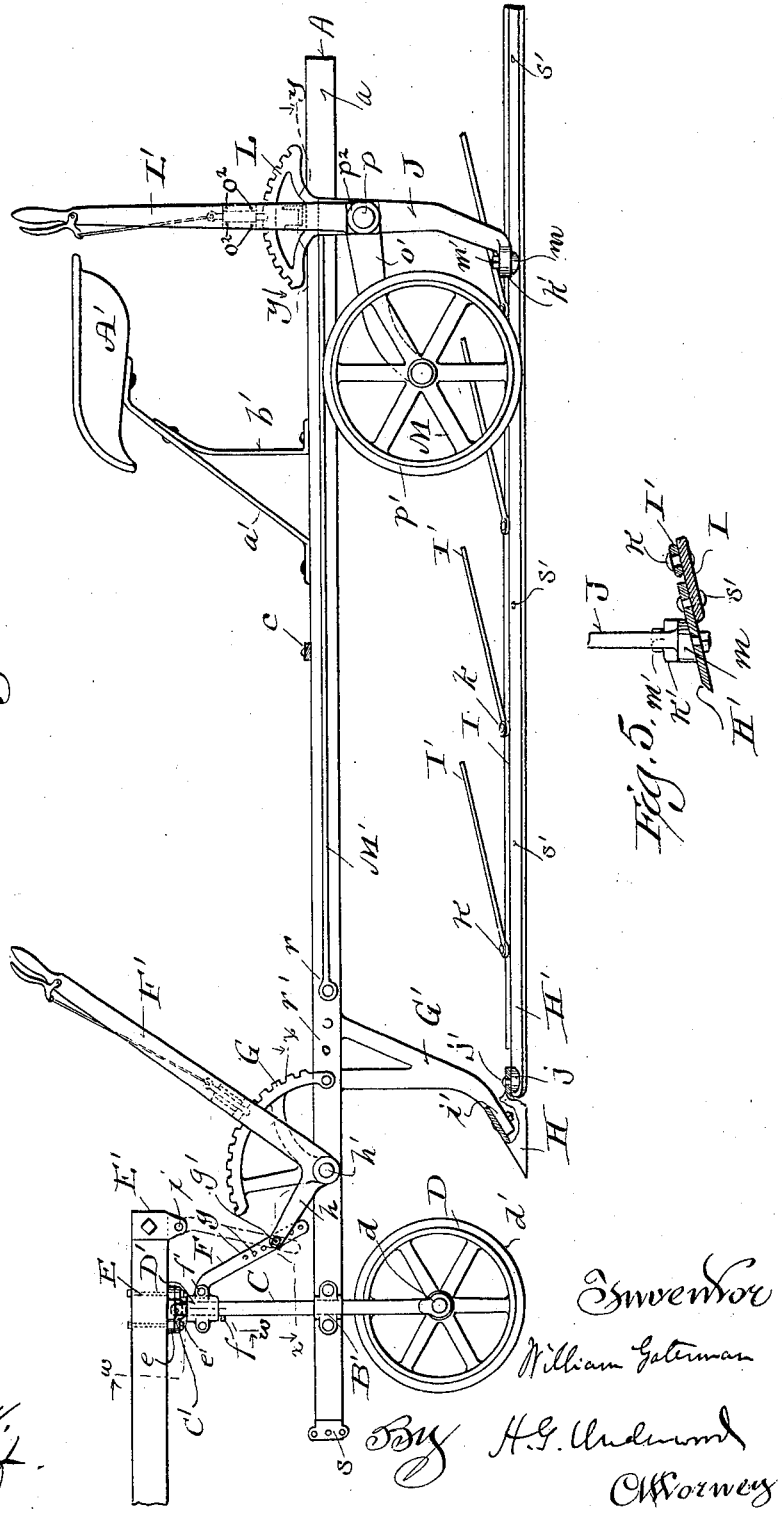

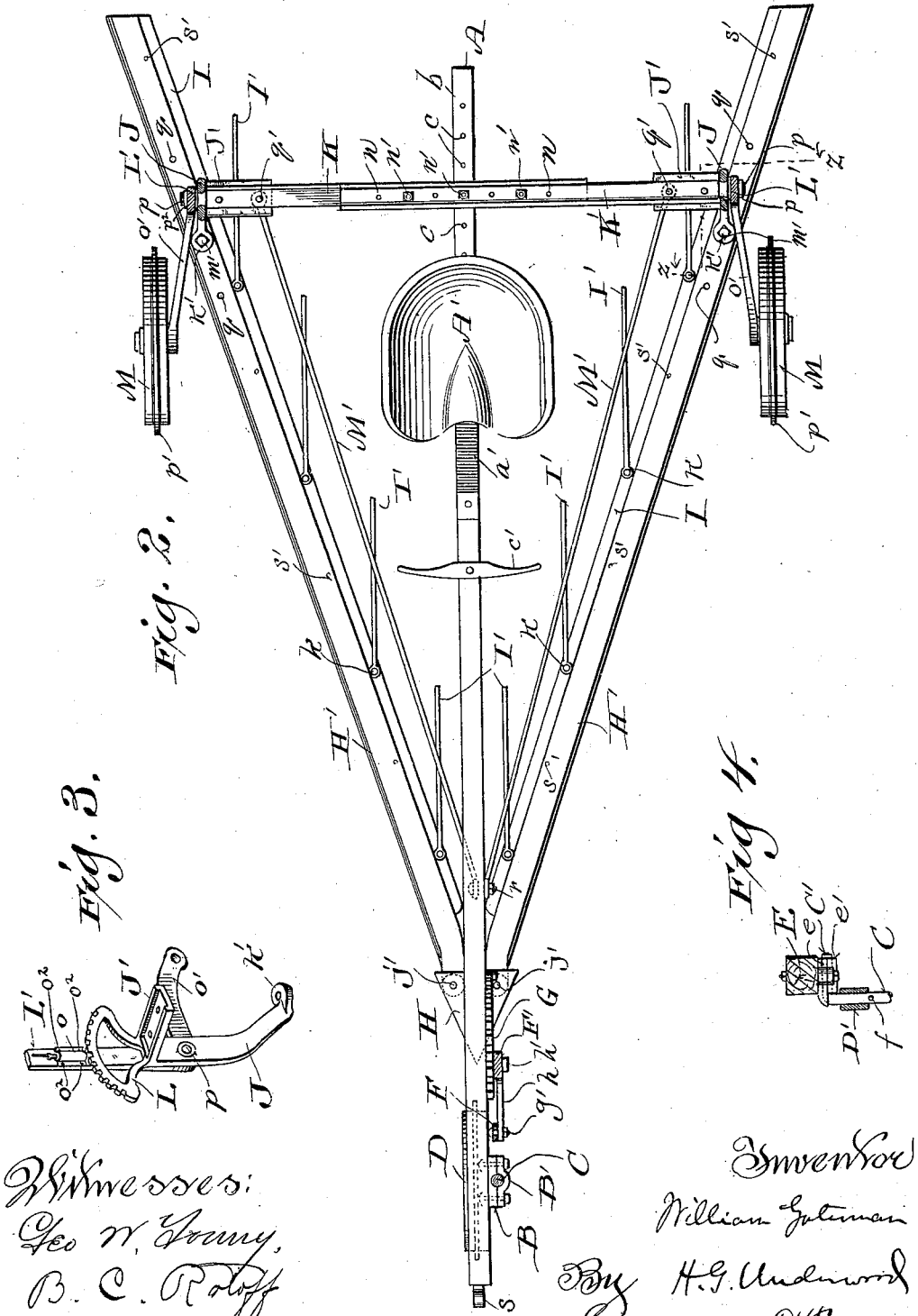

WILLIAM GATERMAN, OF NEWTONBURG, WISCONSIN.

WEED-DESTROYER.

SPECIFICATION forming part of Letters Patent No. 687,302, dated November 26, 1901.

Application filed April 1, 1901. Serial No. 53,774. (No model.)

*To all whom it may concern:*

Be it known that I, WILLIAM GATERMAN, a citizen of the United States, and a resident of Newtonburg, in the county of Manitowoc and State of Wisconsin, have invented certain new and useful Improvements in Weed-Destroyers; and I do hereby declare that the following is a full, clear, and exact description thereof.
My invention is especially designed to destroy Canada thistles and other noxious weeds by cutting them off from their roots at any desired depth below the surface of the ground; and it consists in certain peculiarities of construction and combination of parts, as will be fully described hereinafter, in connection with the accompanying drawings, and subsequently claimed.

In the said drawings, Figure 1 is a side elevation of my improved device partly broken away at one point to better illustrate certain details of construction. Fig. 2 is a plan view of the said device, partly in section, on the lines $x$ $x$ and $y$ $y$ of Fig. 1. Fig. 3 is a perspective view of one of the rear-wheel and knife-bar supporting and adjusting devices detached from the device and turned around to better show details of construction. Fig. 4 is a detail sectional view on the line $w$ $w$ of Fig. 1. Fig. 5 is a detail sectional view on the line $z$ $z$ of Fig. 2.

Referring to the drawings, A represents the central longitudinal beam of my device, preferably formed of angle-iron, with one vertical flange $a$ (shown in Fig. 1) and an upper horizontal flange $b$, (shown in Fig. 2,) said beam being provided with a series of holes $c$ $c$ $c$ through the flange $b$ thereof adjacent to its rear end. Forward of the holes $c$ $c$ a seat-spring $a'$ is secured to the beam A, and a seat A' is supported on the free end of said seat-spring, the latter being strengthened by a brace $b'$, secured to it and the beam A, and a transverse foot-rest $c'$ is secured to said beam in front of the seat-spring.

B B' represent a suitable box or bearing and its cap, bolted or riveted to the vertical flange $a$ of the beam A near the forward end thereof, for the reception of a vertical round rod C, having vertical as well as rotary movement in said box or bearing, as hereinafter described, and to a journal or stud $d$ at the lower end of said rod C there is revolubly secured a wheel D, having an annular flange $d'$ on its periphery. The upper end of the rod C is bent horizontally, as shown at C', and this bent upper end is supported by a split box or bearing $e$ $e'$, bolted to the under side of the tongue or pole E of the device, and just below this bent upper end the said rod C is fitted with a split sleeve or collar D', kept in place by a pin $f$ in said rod.

F is a link pivotally connected to one of the bolts $f'$ of the split sleeve or collar D' and provided with a series of holes $g$ $g$, whereby said link may be adjustably connected by a bolt $g'$ to the short arm $h$ of a bell-crank hand-lever F', secured to the beam A by a pivot-bolt $h'$, which also serves as one of the bolts which secure to said beam a toothed segment G for engagement with the spring-pawl on said hand-lever, said pawl being of the ordinary construction, like the one shown at $o$ in Fig. 3. The inner end of the tongue or pole E is fitted with a clip or housing E', whose lower projecting end is perforated to receive a bolt $i$, so that when desired the upper end of the link F may be detached from the sleeve or collar D' by removing the bolt $f'$ and attached to the clip or housing E' by means of said bolt $i$, as hereinafter described. G' is a leg secured to the beam A and projecting downward below the said segment G, said leg terminating in a downward and forward projecting foot $i'$, which is bolted to a shovel-point H.

H' H' represent a pair of knife-bars whose front ends are secured by pivot-bolts $j'$ $j'$ to the rear end of the shovel-point H, so as to diverge rearwardly, as shown in Fig. 2, and there being wedge-shaped washers $j$ on said bolts $j'$ interposed between the under side of said rear end of the shovel-point and the upper surfaces of said knife-bars, whereby the said knife-bars H' H' are set so as to incline downwardly at any angle desired all along their outer or cutting edges, as best shown in Fig. 1.

I I represent straight strengthening-bars secured by bolts $s'$ $s'$ to the under sides of the inner edges of the knife-bars H' H' and extending inwardly therefrom for practically the entire length of said knife-bars and each of said bars I I having a series of fingers I' I' loosely secured thereto by bolts $k\ k$, so as to project inwardly, upwardly, and rearwardly opposite each other.

J J represent bent standards or legs having forwardly-projecting feet $k'$, secured by bolts $m'$ to the described knife-bars H' H', wedge-shaped washers $m$, like the just-described washers $j$, being interposed between said feet $k'$ and the knife-bars on said bolts $m'$, as shown in Figs. 1 and 5, to keep the latter at the desired inclination. The said standards or legs J are each provided with a laterally and inwardly projecting socket-plate J', rigid or integral therewith, for the reception of the cross-bars K K', whose outer ends rest on said socket-plates J' and are bolted thereto and project inwardly toward the opposite side, the cross-bar K resting on the beam A and the cross-bar K' resting on the bar K, as shown in Fig. 2. Each of these cross-bars is preferably formed of a strip of angle-iron and provided with series of holes $n\ n$ therethrough, which are adapted to register as the knife-bars are spread farther apart or brought nearer together at the rear, and then the cross-bars are held in their adjusted positions by means of bolts $n'\ n'$, passing through the coinciding holes of both bars K K' and secured by proper nuts, the bolt $n'$ at the center also passing through one of the holes $c$ in the rear end of the beam A, whereby this laterally-adjustable frame, comprising the standards or lugs J J, socket-plates J' J', and bars K K', is secured to the beam A.

Rising from the standards or lugs J, and preferably cast integrally therewith, are toothed segments L, which engage with spring-pawls $o$ on bell-crank hand-levers L', pivotally secured, as shown at $p$, to the standards or legs J, and the short arms $o'$ of said levers L' carry at their outer ends the wheels M, which wheels have annular flanges $p'$ on their peripheries, like the wheel D already described. These rear wheels M are shown in the accompanying drawings as running outside the knife-bars H' H'; but, if desired, the nuts $p^2$ on the pivot-bolts $p$ may be loosened and removed, and the levers L' and wheels connected thereto may be removed from said pivot-bolts $p$ and turned around and again secured to the pivot-bolts $p$, as hereinafter described, with the wheels M M now between the knife-bars H' H' and at the rear of the laterally-adjustable frame.

The machine is strengthened by means of brace-rods M', whose rear ends are secured to the bolts $q'\ q'$, which serve to unite the socket-plates J' to the cross-bars K and K' and whose forward ends are secured by bolts $r$ to the beam A, and in order to provide for the different adjustment of the device the knife-bars are formed with series of holes $q$ therethrough for the reception of the described bolts $m'$, which serve to secure the feet $k'$ of the frame to the said knife-bars, and correspondingly the beam A is provided with series of holes $r'$ for the reception of the bolts $r$, which hold the forward ends of the brace-rods M' to said beam. The front end of the beam A is shown provided with an ordinary clevis $s$, whereby the machine may be drawn by horses in the way usual to agricultural implements.

The operation of my improved weed-destroyer will be readily understood from the foregoing description of its construction, taken in connection with the accompanying drawings. In practice, as the object is to sever the roots below the surface of the ground, as already stated, it will be understood that the device is to be adjusted so that the shovel-point and forward ends of the knife-bars will be projected downward below the plane on which the wheel D travels, which is accomplished by means of the described hand-lever F', a forward movement of said lever serving to depress said wheel by drawing down on the link F and split sleeve or collar D', the latter bearing on the pin $f$, and thereby depressing the rod C and the wheel D suspended therefrom. At the same time (when the link F is connected as just described, and shown in full lines in Fig. 1) by reason of the rod C being round and supported in a round bearing the horses can be driven to one side or the other, and the wheel D will follow the accompanying movement of the tongue or pole E. If it is desired to lock the device, so that only travel in a straight line is possible, then the upper end of the link F is connected to the clip or housing E' at the end of the tongue or pole E, as hereinbefore described, and shown by the dotted position of said link F in Fig. 1. By reason of the described annular flanges $d'$ and $p'$ on the wheels D and M the said flanges cut into the ground and serve as guides in aiding to prevent the device from swerving sidewise. The lever F' can be operated so as to vary the distance below the bottom line of the wheel D and the shovel-point H, and thus regulate the depth of the penetration of said shovel-point below the surface. Similarly when it is desired to vary the distance between the line of travel of the rear wheels M M and the rear end of the knife-bars H' H' this is accomplished by moving the levers L' L' either forward or back, as necessary, so as to depress the wheels or raise them relative to the plane of the said knife-bars. As the machine is drawn forward the knife-bars H' H' sever the roots and the fingers I' I' serve to lift the severed parts out of the ground and loosen the earth from them, as well as to turn the earth over toward the central line of the machine. By operating my machine several times during the summer through a field badly infested with weeds the latter will be thoroughly destroyed and the knife-bars can be readily adjusted, in the manner already described, to vary the width of the cut as desired in any instance.

When it is desired to vary the angle of inclination of the cut of the knife-bars H' H', this is done by loosening the bolts $j'$ and $m'$ and turning the described wedge-shaped washers $j$ and $m$ partly around, and then again tightening said bolts, thereby drawing or forcing the said knife-bars into the desired new inclination and keeping them rigidly at the angle to which they have been thus adjusted, and when it is desired to transport the machine from place to place before using it it is desirable, of course, that the shovel-point H and the knife-bars H' H' should not dig into the ground, and to prevent this all the levers F' L' L' are moved forward, the parts being locked in the adjusted positions by the engagement of the lever-pawls with the segments G L L. When it is desired that the rear wheels M shall be projected backward behind the laterally-adjustable frame and between the knife-bars H' H', as hereinbefore referred to, it will be noted that in order to have the spring-pawls $o$ engage with the segments L this can be accomplished either by putting the left-hand lever L' upon the right-hand pivot-bolt $p$ and the right-hand lever L' upon the left-hand pivot-bolt $p$ and tightening same to place by the nuts $p^2$, or, if preferred, the bolts $o^2 o^2$, which secure the spring-pawls $o$ to the levers L', may be loosened and the said spring-pawls secured by said bolts to the opposite faces of said levers, and if this is done the levers L' can each be replaced on their original pivot-bolts $p$ after they have been reversed, so as to project their attached wheels backward, as described, and secured in place by the said nuts $p^2$.

While I have very particularly described the preferred construction of my machine, it will be understood that I do not limit myself to the precise mechanical details illustrated in the drawings, which may be varied as desired in any particular case within the scope of my claims without departing from the spirit of my invention.

Having thus described my invention, what I claim as new, and desire to secure by Letters Patent, is—

1. A weed-destroyer, comprising a longitudinal beam, extending the entire length of the machine; a vertically-adjustable rod at the front of the machine, and a wheel journaled to the lower end of said rod; a leg depending from said beam, back of the said wheel; a shovel-point secured to the lower end of said leg; a pair of rearwardly-diverging knife-bars pivotally attached to said shovel-point; series of fingers loosely secured to and projecting upwardly and rearwardly from said knife-bars; a laterally-adjustable frame, resting on said beam and connected to said knife-bars for regulating the degree of divergence thereof; and vertically-adjustable rear wheels connected to the said adjustable frame.

2. In a weed-destroyer, the combination of a longitudinal beam, a vertically-adjustable wheel supported at the front end thereof; a leg depending from said beam, back of said wheel, and carrying a shovel-point at its lower end projecting at a plane below that of said wheel; a pair of rearwardly-diverging knife-bars pivotally attached to said shovel-point, and each carrying a series of loosely-secured upwardly and rearwardly projecting fingers; means for varying the divergence of said knife-bars; and vertically-adjustable wheels at the rear of the machine, adapted for travel on a plane above the plane of said shovel-point and knife-bars.

3. In a weed-destroyer, the combination with a longitudinal beam, of a vertically-adjustable wheel supported at the front end of said beam; a central shovel-point suspended from said beam, back of said wheel; laterally-adjustable knife-bars pivotally secured to said shovel-point and extending in divergent lines to the rear of the machine; and a pair of vertically-adjustable rear wheels, all of said wheels being designed to travel on the surface of the earth and the said shovel-point and knife-bars to penetrate below the surface thereof.

4. In a weed-destroyer, the combination with a longitudinal beam, of a vertically-adjustable wheel supported at the front end of said beam; a central shovel-point suspended from said beam back of said wheel; laterally-adjustable knife-bars pivotally secured to said shovel-point, and extending in divergent lines to the rear of the machine; series of fingers loosely secured to and projecting upwardly and rearwardly from said knife-bars; and a pair of vertically-adjustable rear wheels.

5. In a weed-destroyer, the combination with a longitudinal beam, of a vertically-adjustable wheel supported at the front end of said beam; a central shovel-point suspended from said beam back of said wheel; laterally-adjustable knife-bars pivotally secured to said shovel-point, and extending in divergent lines to the rear of the machine; a frame secured to said beam intermediate of the ends thereof, and attached to said knife-bars; and a pair of vertically-adjustable rear wheels connected to said frame.

6. In a weed-destroyer, the combination with a longitudinal beam, of a tongue or pole linked to said beam; a front wheel connected to said tongue or pole and to said beam, and rear wheels connected to said beam, with means for the independent vertical adjustment of all of said wheels; and a central shovel-point suspended from the front part of said beam, at a fixed distance below the same, back of the front wheel, the said tongue or pole, shovel-point, and front wheel being longitudinally in line with each other, and vertically in line with said beam.

7. In a weed-destroyer, the combination with a longitudinal beam, of a front wheel, and a pair of rear wheels connected to said beam, with means for the independent vertical adjustment of all of said wheels; a central shovel-point suspended from the front part of said beam, at a fixed distance below the same, back of the front wheel; and a pair of laterally-adjustable knife-bars pivotally secured to said shovel-point, and extending in divergent lines to the rear of the machine beyond the line of said rear wheels, the said shovel-point and front wheel being longitudinally in line with each other, and vertically in line with said beam.

8. In a weed-destroyer, the combination with a longitudinal beam, of a central shovel-point suspended from the front part of said beam at a fixed distance below the same; a pair of knife-bars pivotally secured at their front ends to the rear end of said shovel-point, and having outwardly and downwardly inclined cutting edges, and means for varying the angle of inclination of the cutting edges of said knife-bars, and for keeping said bars rigidly at the angle to which they have been adjusted.

9. In a weed-destroyer, the combination with a longitudinal beam, of a central shovel-point suspended from the forward part of said beam; laterally-adjustable knife-bars, having outwardly and downwardly inclined cutting edges, pivotally secured to said shovel-point, and extending in divergent lines to the rear of the machine, and means for varying the angle of inclination of the cutting edges of said knife-bars, and for keeping said bars rigidly at the angle to which they have been adjusted.

10. In a weed-destroyer, the combination with a longitudinal beam, of a shovel-point suspended from the forward part of said beam; a pair of knife-bars secured by pivot-bolts at their front ends to said shovel-point, and having outwardly and downwardly inclined cutting edges; a frame, secured to said beam back of the line of said shovel-point, and having forwardly-turned feet projecting over said knife-bars, and secured by bolts thereto; wedge-shaped washers on said bolts, interposed between the under surfaces of said feet and the upper surfaces of said knife-bars, and like washers on the first-named bolts, between the shovel-point and knife-bars whereby the said washers may be turned on said bolts to vary the angle of inclination of the cutting edges of said knife-bars; and tightening-nuts on said bolts, to keep said bars rigidly at the angle of inclination to which they have been adjusted.

11. In a weed-destroyer, the combination with a longitudinal beam, of a front wheel connected to said beam; a central shovel-point suspended from the front part of said beam, at a fixed distance below the same, back of the front wheel; a pair of knife-bars pivotally secured to said shovel-point, and extending in divergent lines to the rear of the machine; a transverse frame adjustably connected to said beam; a pair of levers, having longitudinally-projecting arms and pivotally connected to said frame, and a pair of rear wheels connected to the outer ends of said arms, whereby the said lever-arms may be projected rearwardly to thereby bring the said rear wheels between the divergent knife-bars, or projected forwardly to thereby carry said rear wheels outside of said knife-bars.

12. In a weed-destroyer, the combination with a longitudinal beam, of a pair of knife-bars, whose front ends are pivotally secured to a support depending from said beam, and having outwardly and downwardly inclined cutting edges, and means for varying the angle of inclination of the cutting edges of said knife-bars, and for keeping said bars rigidly at the angle to which they have been adjusted.

13. In a weed-destroyer, the combination with a longitudinal beam, having a shovel-point and knife-bars suspended therefrom, of a vertical box or bearing secured to said beam, adjacent to the front end thereof; a vertical round rod having vertical and rotary movement in said box or bearing, and formed with a horizontally-bent upper end; a tongue or pole having a box or bearing for the said bent upper end of said rod; a wheel journaled to the lower end of said rod; a sleeve loosely secured to said rod just beneath its bent upper end; a clip or housing on the rear end of said tongue or pole; a toothed segment on said beam back of said rod; a bell-crank hand-lever pivoted to said beam, and having a pawl on its long arm for engagement with said segment; and a link, one end of which is adjustably and pivotally secured to the short arm of said lever, and the other end of which is adapted for pivotal engagement with either the loose sleeve on the rod, or the clip or housing on the tongue or pole.

14. In a weed-destroyer, the combination with a longitudinal beam, having a shovel-point and knife-bars suspended therefrom and a vertically-adjustable wheel supported at its front end, of an adjustable frame connecting said beam and knife-bars at the rear; toothed segments rising from the standards of said frame; bell-crank hand-levers pivotally secured to the frame-standards, and carrying pawls for engagement with said segments; and rear wheels journaled to the free ends of the short arms of said levers.

In testimony that I claim the foregoing I have hereunto set my hand, at Newtonburg, in the county of Manitowoc and State of Wisconsin, in the presence of two witnesses.

WILLIAM GATERMAN.

Witnesses:
PEARL SMART,
A. J. NASH.